United States Patent
Kato

(10) Patent No.: US 12,307,195 B2
(45) Date of Patent: May 20, 2025

(54) INFORMATION PROCESSING APPARATUS CAPABLE OF APPROPRIATELY USING A PLURALITY OF CONTENT RECOMMENDATION METHODS IN RESPONSE TO USER'S USAGE STATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Yasuko Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/347,308

(22) Filed: Jul. 5, 2023

(65) Prior Publication Data
US 2024/0012990 A1 Jan. 11, 2024

(30) Foreign Application Priority Data
Jul. 8, 2022 (JP) .................................. 2022-110516

(51) Int. Cl.
  *G06F 3/048*  (2013.01)
  *G06F 40/106*  (2020.01)
  *G06F 40/186*  (2020.01)
(52) U.S. Cl.
  CPC .......... *G06F 40/186* (2020.01); *G06F 40/106* (2020.01)

(58) Field of Classification Search
  CPC .... G06F 40/186; G06F 40/106; G06F 16/435; H04N 21/4826; H04N 21/4668
  See application file for complete search history.

(56) References Cited

U.S. PATENT DOCUMENTS 11,487,835 B2 *  11/2022  Swezey ............... G06F 16/9035
11,507,849 B2 *  11/2022  Xie ......................... G06N 5/02
2007/0011203 A1 *  1/2007  Tsunoda ............. H04N 21/4532
(Continued)

FOREIGN PATENT DOCUMENTS

CN  104090905 A  * 10/2014  ....... G06F 17/30536
CN  113032680 A  *  6/2021
(Continued)

*Primary Examiner* — Rashawn N Tillery
(74) *Attorney, Agent, or Firm* — Venable LLP

(57) ABSTRACT

An information processing apparatus capable of appropriately using a plurality of content recommendation methods in response to the usage status of a user is provided. The information processing apparatus includes a controller configured or programmed to function as a storing unit storing a usage count, a dividing unit dividing data about the usage count into calculation data and evaluation data, a calculating unit obtaining a first recommended result by a first recommendation method, a calculating unit calculating a second recommended result based on the calculation data by a second recommendation method, a calculating unit obtaining a first accuracy rate and a second accuracy rate based on the evaluation data, and a setting unit setting a recommendation method for determining contents to be recommended to a predetermined user by using the first recommendation method and the second recommendation method based on the first accuracy rate and the second accuracy rate.

11 Claims, 17 Drawing Sheets

(56) References Cited

U.S. PATENT DOCUMENTS

| | | | |
|---|---|---|---|
| 2010/0274802 A1* | 10/2010 | Abe | G06F 16/532 715/764 |
| 2012/0233183 A1 | 9/2012 | Nakahashi et al. | 707/749 |
| 2014/0297677 A1* | 10/2014 | Shimizu | G06F 16/3322 707/767 |
| 2014/0372453 A1* | 12/2014 | Rajaram | G06F 16/435 707/749 |
| 2015/0134653 A1* | 5/2015 | Bayer | H04N 21/4826 707/732 |
| 2015/0169585 A1* | 6/2015 | Korst | H04N 21/4826 707/748 |
| 2015/0186934 A1* | 7/2015 | Van Deventer | H04N 21/4826 705/14.49 |
| 2015/0296234 A1* | 10/2015 | Korst | H04N 21/251 725/87 |
| 2016/0274744 A1* | 9/2016 | Neumann | H04N 21/47202 |
| 2017/0142484 A1* | 5/2017 | Jeon | H04N 21/4755 |
| 2017/0188102 A1* | 6/2017 | Zhang | H04N 21/4532 |
| 2018/0213284 A1* | 7/2018 | Shekhar | H04N 21/4532 |
| 2018/0234732 A1* | 8/2018 | Galuten | H04N 21/4668 |
| 2018/0367862 A1* | 12/2018 | Horii | H04N 21/25891 |
| 2020/0221181 A1* | 7/2020 | Gupta | G06F 16/7867 |
| 2021/0011958 A1* | 1/2021 | Cox | G06F 16/9035 |
| 2021/0034324 A1* | 2/2021 | Funayama | G06F 3/167 |
| 2021/0065218 A1* | 3/2021 | Wang | G06N 20/00 |
| 2021/0168450 A1* | 6/2021 | Gritzman | H04N 21/4668 |
| 2022/0124408 A1* | 4/2022 | Weerasinghe | G06Q 30/0246 |
| 2022/0150591 A1* | 5/2022 | Miller | H04N 21/47202 |
| 2022/0394349 A1* | 12/2022 | Sanders | H04N 21/4826 |
| 2022/0414323 A1* | 12/2022 | Sreenivasan | G06F 40/186 |
| 2023/0205802 A1* | 6/2023 | Wang | G06F 16/9535 707/728 |
| 2023/0319358 A1* | 10/2023 | Jalan | H04N 21/4668 725/46 |
| 2024/0155195 A1* | 5/2024 | Xiao | H04N 21/4668 |

FOREIGN PATENT DOCUMENTS

| | | | | |
|---|---|---|---|---|
| CN | 117788105 A | * | 3/2024 | |
| JP | 2012-190061 | | 10/2012 | |
| JP | 2012190061 A | * | 10/2012 | G06F 16/9535 |
| WO | WO-2018145577 A1 | * | 8/2018 | G06F 16/00 |

* cited by examiner

| USAGE DATE | USER ID | TEMPLATE ID |
|---|---|---|
| 2022-04-01 | USER A | TEMPLATE a |
| 2022-04-01 | USER A | TEMPLATE b |
| 2022-04-01 | USER A | TEMPLATE a |
| 2022-04-01 | USER A | TEMPLATE b |
| 2022-04-03 | USER A | TEMPLATE a |
| 2022-04-03 | USER A | TEMPLATE b |
| 2022-04-04 | USER A | TEMPLATE a |
| 2022-04-12 | USER B | TEMPLATE c |
| 2022-04-12 | USER B | TEMPLATE d |
| 2022-04-12 | USER B | TEMPLATE e |
| 2022-04-12 | USER B | TEMPLATE d |
| 2022-04-12 | USER C | TEMPLATE b |
| 2022-04-12 | USER C | TEMPLATE c |
| 2022-04-12 | USER B | TEMPLATE c |
| 2022-04-21 | USER A | TEMPLATE a |
| 2022-04-29 | USER C | TEMPLATE b |
| 2022-04-29 | USER C | TEMPLATE c |
| 2022-04-29 | USER C | TEMPLATE d |
| 2022-04-29 | USER C | TEMPLATE e |
| 2022-04-30 | USER A | TEMPLATE a |

|  | TEMPLATE a | TEMPLATE b | TEMPLATE c | TEMPLATE d | TEMPLATE e |
|---|---|---|---|---|---|
| USER A | 6 | 3 | 0 | 0 | 0 |
| USER B | 0 | 0 | 2 | 2 | 1 |
| USER C | 0 | 2 | 2 | 1 | 1 |

|  | TEMPLATE a | TEMPLATE b | TEMPLATE c | TEMPLATE d | TEMPLATE e |
|---|---|---|---|---|---|
| TOTAL USAGE COUNT | 6 | 5 | 4 | 3 | 2 |

|  | FIRST PLACE | SECOND PLACE | THIRD PLACE |
|---|---|---|---|
| USER A | TEMPLATE c | TEMPLATE d | TEMPLATE e |
| USER B | TEMPLATE b | TEMPLATE c | – |
| USER C | TEMPLATE a | – | – |

| | TEMPLATE a | TEMPLATE b | TEMPLATE c | TEMPLATE d | TEMPLATE e |
|---|---|---|---|---|---|
| USER A | 6 | 3 | 0 | 0 | 0 |
| USER B | 0 | 0 | 2 | 2 | 1 |
| USER C | 0 | 2 | 2 | 1 | 1 |

| | TEMPLATE a | TEMPLATE b | TEMPLATE c | TEMPLATE d | TEMPLATE e |
|---|---|---|---|---|---|
| TOTAL USAGE COUNT | 6 | 5 | 4 | 3 | 2 |

*FIG. 9C*

| RECOMMENDED CALCULATION DATA |
|---|
| TEMPLATE d |

*FIG. 9D*

| EVALUATION DATA | TEMPLATE a | TEMPLATE b | TEMPLATE c | TEMPLATE e |
|---|---|---|---|---|
| USAGE COUNT | 0 | 0 | 2 | 1 |

*FIG. 9E*

| RECOMMENDED CALCULATION RESULT FOR USER | | |
|---|---|---|
| TEMPLATE b | TEMPLATE c | TEMPLATE e |

| | TEMPLATE a | TEMPLATE b | TEMPLATE c | TEMPLATE d | TEMPLATE e |
|---|---|---|---|---|---|
| USER A | 5 | 1 | 3 | 0 | 0 |
| USER B | 0 | 1 | 0 | 1 | 0 |
| USER C | 0 | 2 | 0 | 1 | 1 |

| | TEMPLATE a | TEMPLATE b | TEMPLATE c | TEMPLATE d | TEMPLATE e |
|---|---|---|---|---|---|
| TOTAL USAGE COUNT | 5 | 4 | 3 | 2 | 1 |

*FIG. 11C*

| RECOMMENDED CALCULATION DATA |
| --- |
| TEMPLATE d |

*FIG. 11D*

| EVALUATION DATA | TEMPLATE a | TEMPLATE b | TEMPLATE c | TEMPLATE e |
| --- | --- | --- | --- | --- |
| USAGE COUNT | 0 | 1 | 0 | 0 |

*FIG. 11E*

| RECOMMENDED RESULT OBTAINED BY COLLABORATIVE FILTERING ||
| --- | --- |
| TEMPLATE b | TEMPLATE e |

*FIG. 11F*

| RECOMMENDED RESULT OBTAINED BY RANKING ||
| --- | --- |
| TEMPLATE a | TEMPLATE b |

INFORMATION PROCESSING APPARATUS CAPABLE OF APPROPRIATELY USING A PLURALITY OF CONTENT RECOMMENDATION METHODS IN RESPONSE TO USER'S USAGE STATUS, CONTROL METHOD FOR INFORMATION PROCESSING APPARATUS, AND STORAGE MEDIUM

BACKGROUND OF THE INVENTION

Field of the Invention

The present invention relates to an information processing apparatus, a control method for the information processing apparatus, and a storage medium. More particularly, the present invention relates to a technique for recommending contents to a user in response to the usage status of the user in a service used by the user.

Description of the Related Art

The number of users of services for distributing contents such as videos and music is increasing. Such services widely use a technique for recommending contents, which are presumed to match the user, to the user based on the content that has been used by the user.

As an example of a content recommendation method, there is a method of ranking and recommending contents in order of high evaluation by many users among all users, based on a history of content usage by a plurality of users. Such a recommendation method using ranking makes it possible to recommend contents that are popular with all users, but has a problem that contents that match each user cannot be recommended.

As another content recommendation method, there is a method called "content-based recommendation" that obtains the degree of similarity between contents based on characteristics of the contents and recommends contents similar to the content that has been used by the user. Although the above-mentioned recommendation method using ranking is able to only recommend contents that are highly evaluated (rated) by many users, the content-based recommendation is able to recommend unevaluated (unrated) contents to the user. However, since the content-based recommendation is a recommendation method based on the degree of similarity between contents, the content-based recommendation may not recommend contents that match the user.

On the other hand, there is "collaborative filtering" as one of content recommendation methods that enable recommendation of contents that match each user. The collaborative filtering is a content recommendation method that calculates the correlations between contents and between users based on content usage histories of a plurality of users, and recommends highly correlated contents to highly correlated users. In the collaborative filtering, it is possible to make the recommendation that matches each user (it is possible to recommend contents that have been used by people similar to each user but have not been used by each user), but in a situation where the content usage histories of the users are not sufficiently collected, it is difficult to obtain the effect obtained by the collaborative filtering.

As described above, there are many content recommendation methods, each of which has advantages and disadvantages. Therefore, for example, Japanese Laid-Open Patent Publication (kokai) No. 2012-190061 discloses a method of effectively combining and using a plurality of recommendation methods depending on the situation. In the method disclosed in Japanese Laid-Open Patent Publication (kokai) No. 2012-190061, a recommended content is determined by using the result of multiplying content evaluation scores obtained by the plurality of recommendation methods by coefficients and summing them up as a new content evaluation score. Further, the coefficients are modified based on the user's feedback on the recommended content. As a result, it becomes possible to recommend more appropriate contents to each user.

However, with the above conventional technique, it is not easy to appropriately use the plurality of recommendation methods in response to the usage status of the user.

SUMMARY OF THE INVENTION

The present invention provides an information processing apparatus capable of appropriately using a plurality of content recommendation methods in response to the usage status of a user, a control method for the information processing apparatus, and a storage medium.

Accordingly, the present invention provides an information processing apparatus comprising a controller configured or programmed to function as a storing unit that stores a usage count of each of a plurality of contents used by each of a plurality of users, a dividing unit that divides data about the usage count into calculation data for obtaining contents to be recommended to a predetermined user among the plurality of users and evaluation data for obtaining an accuracy rate of a recommended result, a first calculating unit that obtains a first recommended result, which is the contents to be recommended to the predetermined user, by a first recommendation method, a second calculating unit that calculates a second recommended result, which is the contents to be recommended to the predetermined user, based on the calculation data by a second recommendation method, a third calculating unit that obtains a first accuracy rate, which is an accuracy rate of the first recommended result, and a second accuracy rate, which is an accuracy rate of the second recommended result, based on the evaluation data, and a setting unit that sets a recommendation method for determining the contents to be recommended to the predetermined user by using the first recommendation method and the second recommendation method based on the first accuracy rate and the second accuracy rate.

According to the present invention, it becomes possible to appropriately use the plurality of content recommendation methods in response to the usage status of the user.

Further features of the present invention will become apparent from the following description of exemplary embodiments with reference to the attached drawings.

BRIEF DESCRIPTION OF THE DRAWINGS

FIG. 5A is a diagram that shows an example of a usage status management table, FIG. 5B is a diagram that shows an example of a usage count management table, FIG. 5C is a diagram that shows an example of a ranking management table, and FIG. 5D is a diagram that shows an example of a recommended template management table.

FIGS. 9A, 9B, 9C, 9D, and 9E are diagrams that show various kinds of data used when determining recommended templates in the recommended template determining processing of FIG. 8.

FIGS. 11A, 11B, 11C, 11D, 11E, and 11F are diagrams that show various kinds of data used when determining recommended templates in the recommended template determining processing of FIG. 10.

DESCRIPTION OF THE EMBODIMENTS

The present invention will now be described in detail below with reference to the accompanying drawings showing embodiments thereof.

Figure 1:
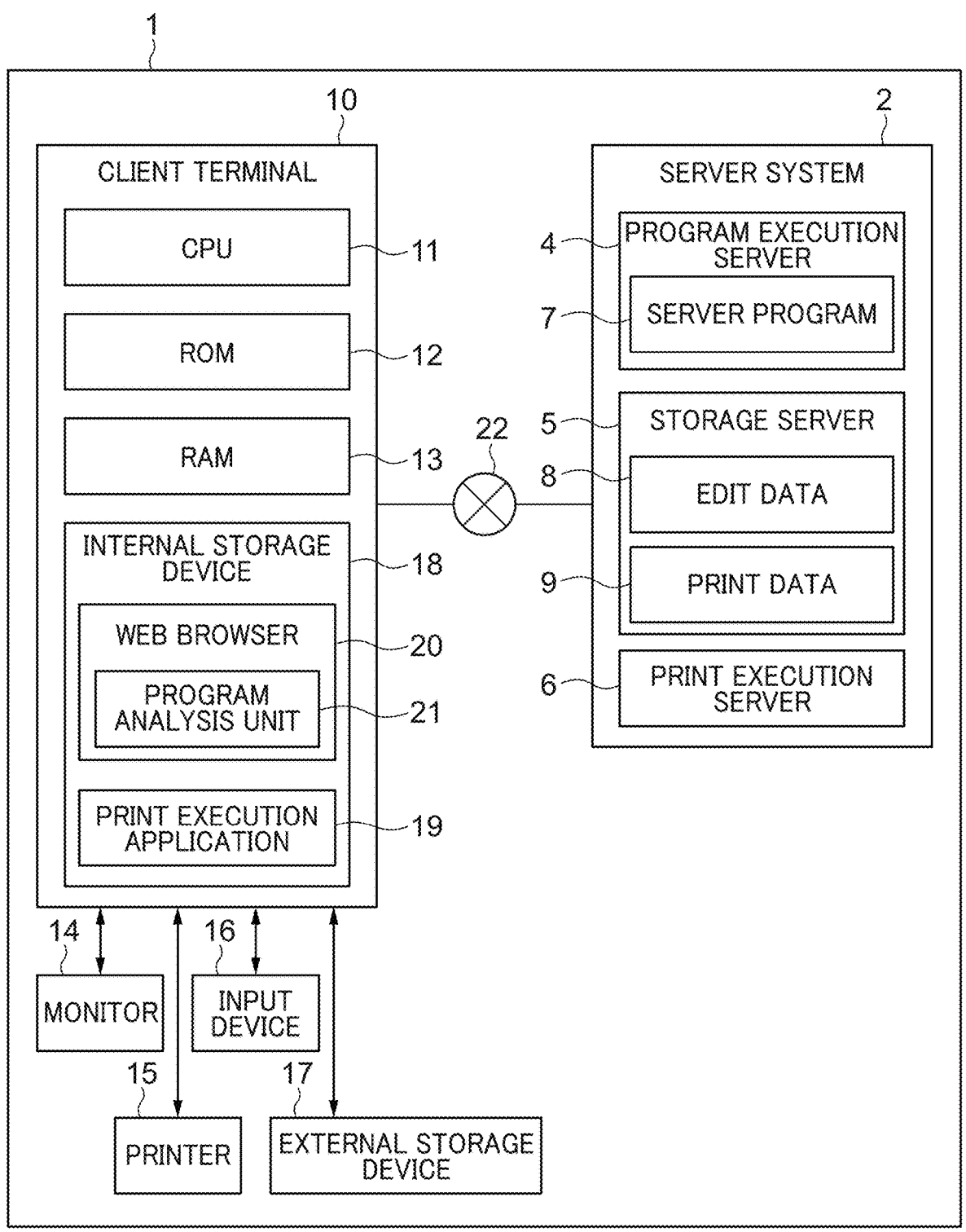
FIG. 1 is a block diagram that shows a schematic configuration of an information processing system according to a preferred embodiment of the present invention.

First, a first preferred embodiment will be described. FIG. 1 is a block diagram that shows a schematic configuration of an information processing system 1 according to a preferred embodiment of the present invention. The information processing system 1 includes a client terminal 10 and a server system 2 that are communicably connected via a network 22. It should be noted that the system configuration of the information processing system 1 is also a system configuration for realizing a second preferred embodiment, a third preferred embodiment, or a fourth preferred embodiment described below.

The server system 2 includes a program execution server 4, a storage server 5, and a print execution server 6. The program execution server 4 is a server for executing a web application, and executes a server program 7, which is a program that runs on the server system 2. The storage server 5 stores edit data 8 such as image files and print data files for the web application, and print data 9. The print execution server 6 transmits the print data 9, which is used for execution of a print execution application 19 on the client terminal 10, to the client terminal 10. The program execution server 4, the storage server 5, and the print execution server 6 may be realized by physically separate apparatuses, or may be realized by one apparatus.

The client terminal 10 is an information processing terminal such as a general personal computer or a smartphone. The client terminal 10 includes a central processing unit (CPU) 11, a read only memory (ROM) 12, a random access memory (RAM) 13, and an internal storage device 18. In addition, the client terminal 10 includes an interface (not shown) for communicably connecting a monitor 14, a printer 15, an input device 16, an external storage device 17, and the network 22.

The CPU 11 controls the overall operation of the client terminal 10 by loading programs such as an operating system (OS) stored in the ROM 12 into the RAM 13 and controlling various kinds of hardware included in the client terminal 10. The ROM 12 stores the programs such as the OS, and parameters, etc. that are necessary for executing various kinds of programs. The RAM 13 is used as a working memory for the CPU 11. The internal storage device 18 is, for example, a solid state drive (SSD), a hard disk drive (HDD), a memory card, or the like, and stores various kinds of application programs executable by the CPU 11 and various kinds of data.

The CPU 11 implements various kinds of functions of the client terminal 10 by executing predetermined applications (programs) stored in the internal storage device 18 or the external storage device 17. For example, by the CPU 11 executing a program of a web browser 20 stored in the internal storage device 18, it becomes possible to browse web sites on the Internet and use the web application provided by the server system 2.

When using the web application provided by the server system 2, the CPU 11 receives a client program from the server system 2 and stores it in the RAM 13 or the internal storage device 18. The script language of the stored client program is interpreted by a program analysis unit 21 within the web browser 20. It should be noted that examples of the script language include hyper text markup language (HTML) and JavaScript.

The print execution application 19 is stored in the internal storage device 18. The print execution application 19 transmits the print data 9 to the printer 15, which is connected to the client terminal 10, to perform printing. It should be noted that the printer 15 and the external storage device 17 need not be directly connected to the client terminal 10 and may be connected to the client terminal 10 via the network 22.

Figure 2:
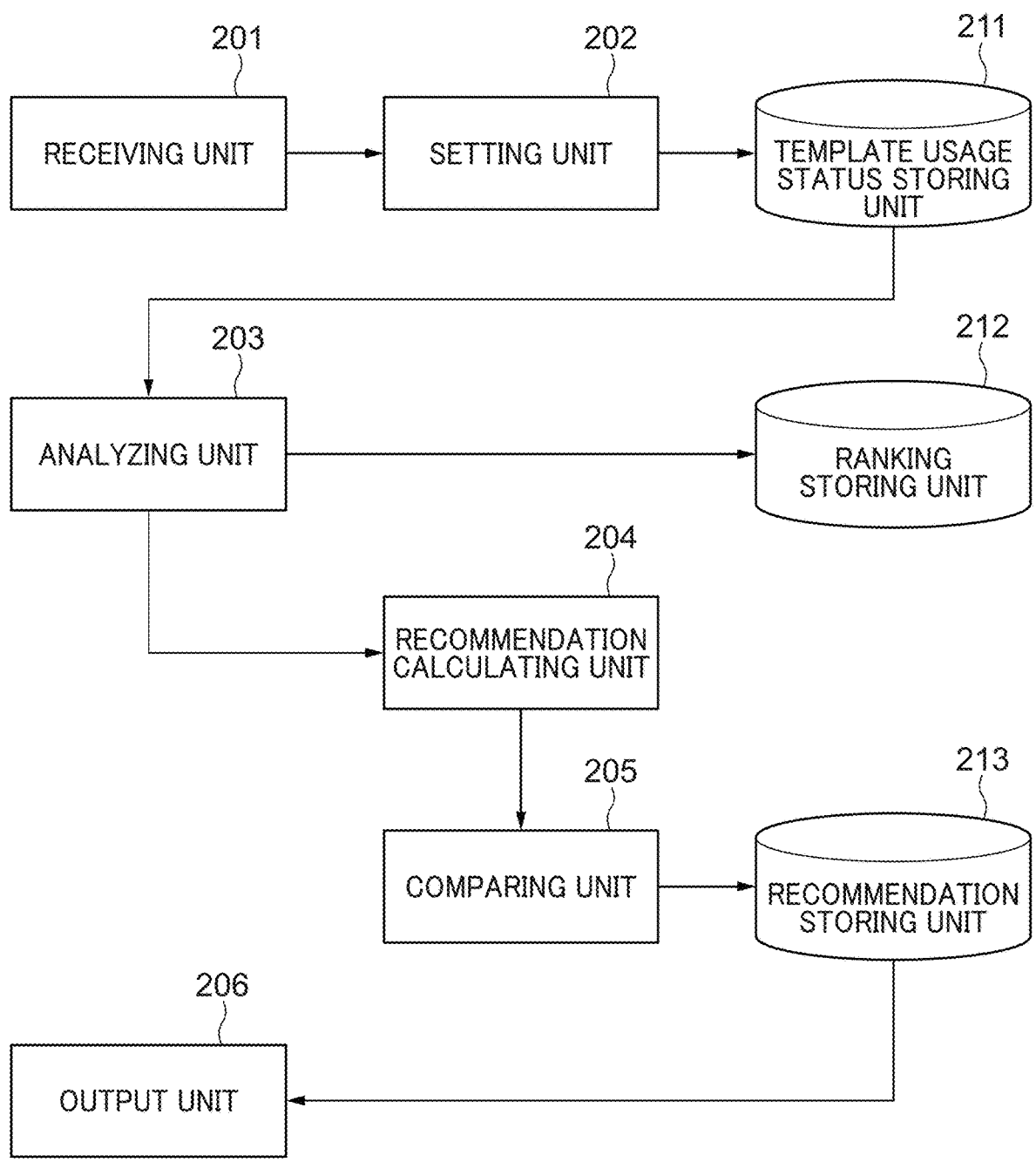
FIG. 2 is a block diagram that shows a schematic configuration of a program execution server.

FIG. 2 is a block diagram that shows a schematic configuration of the program execution server 4. In the following description, templates for printed matter such as posters and leaflets (handbills) are taken up as contents recommended to users by the server system 2, and accordingly, a printed matter production application is taken up as an example of the web application provided by the server system 2. However, the contents recommended to users by the server system 2 are not limited to the templates for the printed matter, and therefore the web application provided by the server system 2 is also not limited to the printed matter production application.

The program execution server 4 includes a receiving unit 201, a setting unit 202, an analyzing unit 203, a recommendation calculating unit 204, a comparing unit 205, an output unit 206, a template usage status storing unit 211, a ranking storing unit 212, and a recommendation storing unit 213.

The receiving unit 201 obtains an identifier that represents a user (a user ID described below), and a template that has been selected by the user. The setting unit 202 updates storage contents of the template usage status storing unit 211 in response to the receiving unit 201 receiving that the template has been selected by the user. The analyzing unit 203 extracts templates with a large number of usage counts from the template usage status storing unit 211 and stores them in the ranking storing unit 212.

The recommendation calculating unit 204 calculates recommended templates for each user by using the template usage status stored in the template usage status storing unit 211 and by means of the collaborative filtering. The comparing unit 205 compares an accuracy rate of the recommended result obtained by the recommendation calculating unit 204 with an accuracy rate of the ranking stored in the ranking storing unit 212, and stores the result obtained by the recommendation method with a high accuracy rate in the recommendation storing unit 213. The output unit 206 outputs the recommended templates for the user, which are stored in the recommendation storing unit 213, to the client terminal 10.

The template usage status storing unit 211 stores and manages the template usage status of each user. The ranking storing unit 212 stores each template, which is extracted from the template usage status storing unit 211 by the analyzing unit 203, in descending order of the total usage count. The recommendation storing unit 213 stores the recommended templates obtained by the recommendation calculating unit 204.

Next, the web application provided by the server system 2 will be described.

Figure 3:
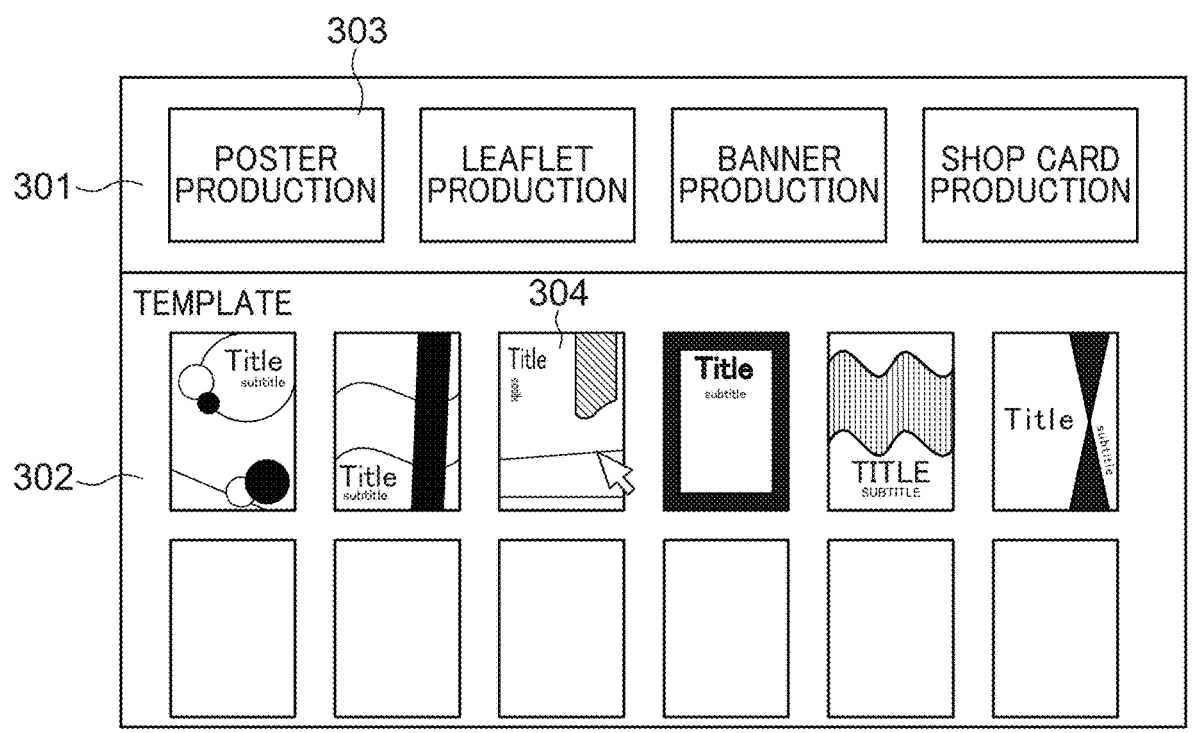
FIG. 3 is a diagram that shows an example of a web application screen.

FIG. 3 is a diagram that shows an example of a web application screen, and shows a screen displayed on the monitor 14 when using the web application after activating the web browser 20 on the client terminal 10.

As shown in FIG. 3, the web application screen includes a production selection area 301 on the upper stage and a template list display area 302 on the lower stage. Buttons (icons), which are used for selecting the types of productions that can be selected on the web application, are displayed on the production selection area 301. When the user selects a desired button from the buttons displayed on the production selection area 301 by means of the input device 16, in response to the selected button, a list of templates held by the web application is displayed on the template list display area 302.

The web application screen of FIG. 3 shows a state, in which a poster production button 303 is selected and a plurality of templates that can be used for poster production are displayed on the template list display area 302 in response to the selected poster production button 303. When one thumbnail is selected by the input device 16 from thumbnails of the plurality of templates displayed on the template list display area 302, the display on the monitor 14 transitions to an example of the next screen shown in FIG. 4.

Figure 4:
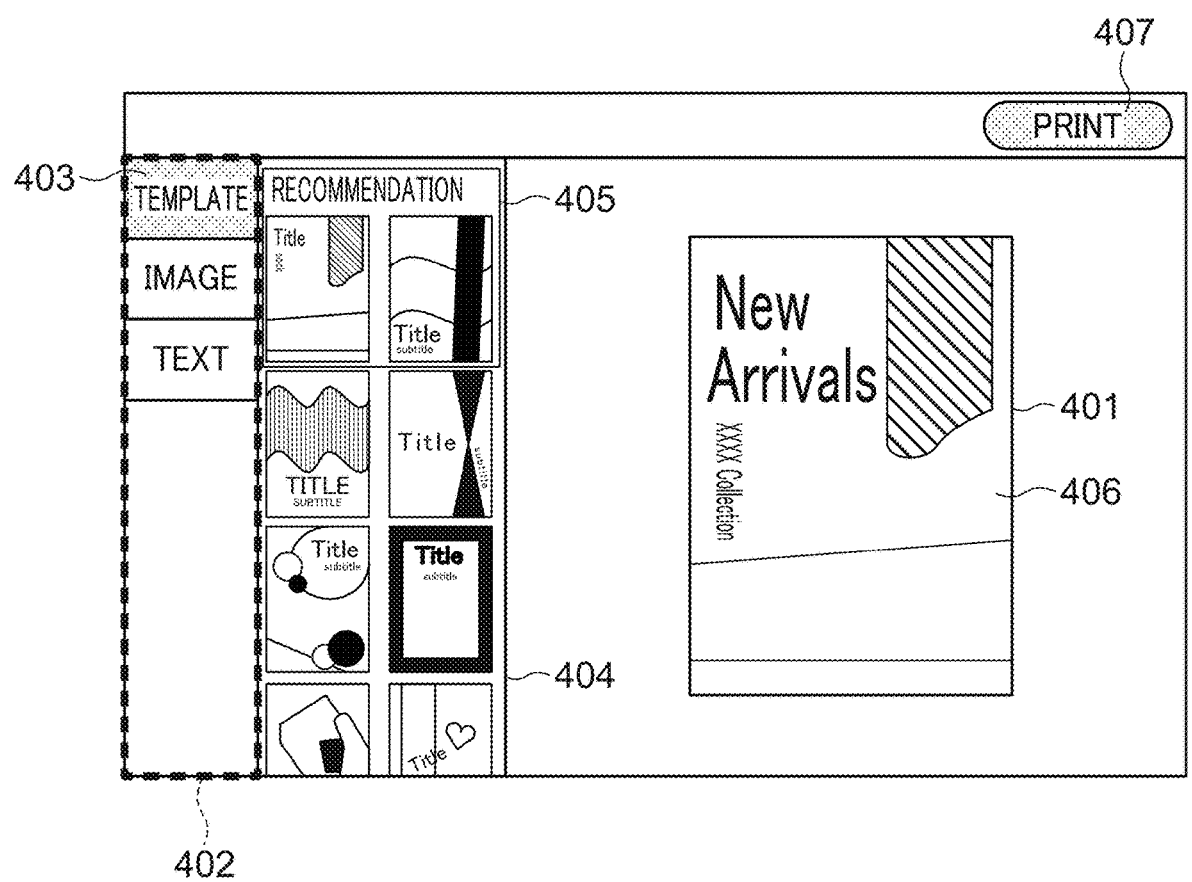
FIG. 4 is a diagram that shows an example of an editing screen displayed when a thumbnail is selected on the web application screen.

FIG. 4 is a diagram that shows an example of a poster editing screen displayed on the monitor 14 when a thumbnail 304 in FIG. 3 is selected. A poster being edited by the user is displayed as a preview 401. Buttons used for selecting the types of objects for poster production are displayed on an area 402, and FIG. 4 shows a state, in which a template button 403 has been selected. An area 404 displays the content corresponding to the object selected on the area 402. In FIG. 4, since the template button 403 has been selected, the list of templates held by the web application is displayed, and the template selected on the template list display area 302 can be changed to another template.

A thumbnail 406 is displayed within the preview 401. The thumbnail 406 is a template arranged within the preview 401 by selecting the thumbnail 304 on the poster editing screen of FIG. 3. A recommendation display area 405 within the area 404 displays a list of recommended templates, which are obtained based on the thumbnail 304 selected on the poster editing screen, in order. The user is able to print the poster displayed on the preview 401 with the printer 15 by selecting a print button 407 by means of the input device 16. In response to the selection of the print button 407, the print execution server 6 transmits the print data 9 to the client terminal 10, and the web browser 20 activates the print execution application 19 and performs printing of the poster displayed on the preview 401.

Next, a method for storing and managing information about the usage status, etc. of templates will be described. FIG. 5A shows an example of a usage status management table 500 used for storing and managing the template usage status of the user in the template usage status storing unit 211. In the usage status management table 500, "user ID" is an identifier that uniquely represents a user, and "template ID" is an identifier that uniquely represents a template. Further, in the usage status management table 500, "usage date" is a date on which a user represented by a user ID has used a template represented by a template ID, and is hereinafter referred to as "a template usage date". For example, the usage status management table 500 stores that a user whose user ID is user A has used a template whose template ID is template a and a template whose template ID is template b multiple times on Apr. 1, 2022.

FIG. 5B shows an example of a usage count management table 510 used for storing and managing the template usage count of the user for a certain period of time in the template usage status storing unit 211. In the usage count management table 510, as in the usage status management table 500, users A to C represent user IDs, and templates a to e represent template IDs. For example, numerical values '6, 3, 0, 0, 0' in respective columns of templates a, b, c, d, and e in the row of user A indicate the number of times user A has used templates a, b, c, d, and e, respectively.

FIG. 5C shows an example of a ranking management table 520 used for storing and managing the ranking of the usage count of the template in the ranking storing unit 212. In the ranking management table 520, as in the usage status management table 500, templates a to e represent template IDs. Further, in the ranking management table 520, "total usage count" indicates the number of times a template represented by a template ID has been used by all users. For example, the ranking management table 520 stores that the template whose template ID is the template a has been used six times by all users.

FIG. 5D shows an example of a recommended template management table 530 used for storing and managing the recommended templates for each user in the recommendation storing unit 213. In the recommended template management table 530, as in the usage status management table 500, users A to C represent user IDs, and templates a to e represent template IDs. For each user ID, the template IDs of the recommended templates obtained by the recommendation calculating unit 204 are shown in rank order. For example, the recommended template management table 530 stores that recommended templates for the user whose user ID is user A are templates whose template IDs are template c, template d, and template e in order from the first place to the third place.

Figure 6:
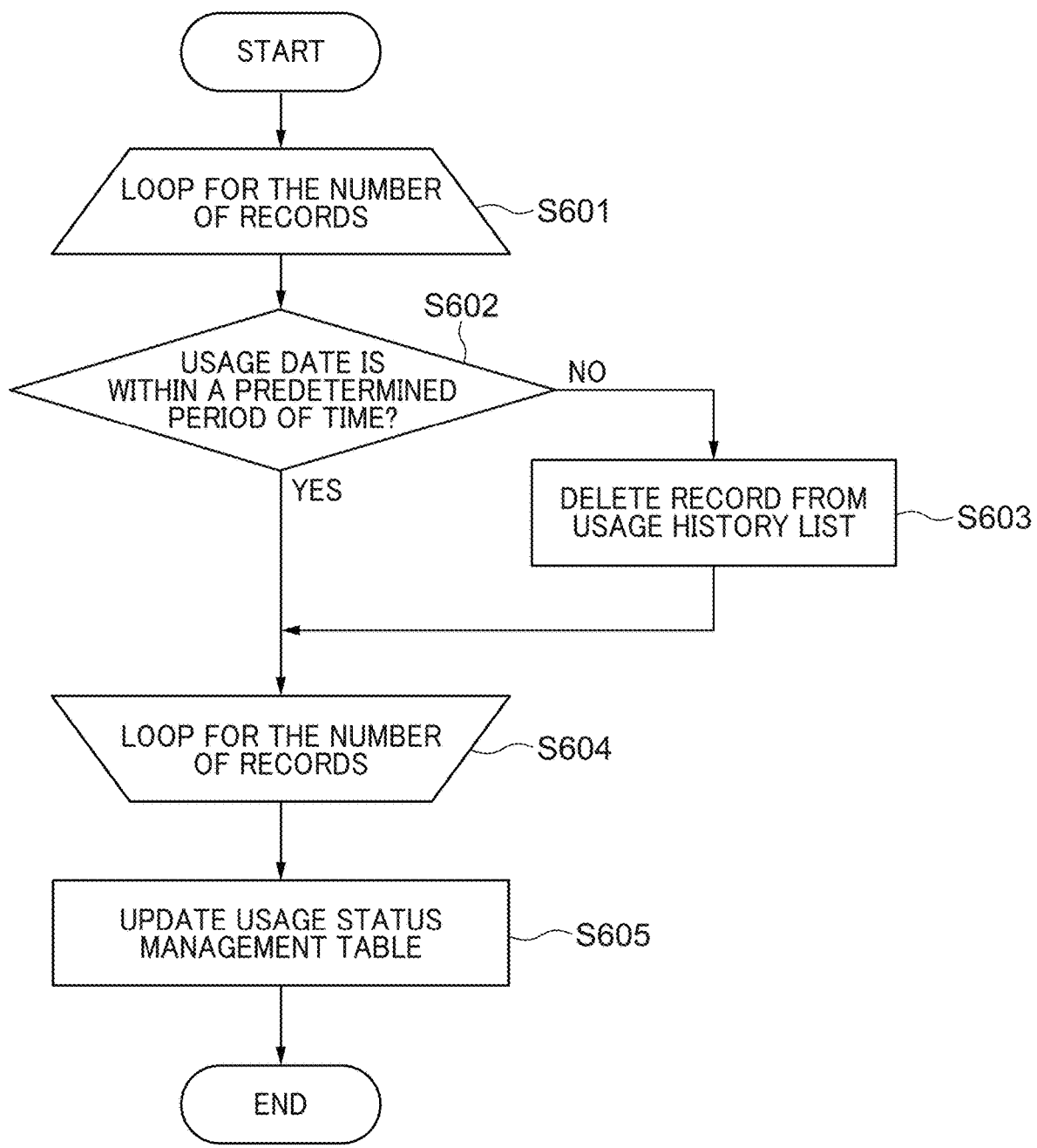
FIG. 6 is a flowchart for explaining a method of updating the usage status management table.

FIG. 6 is a flowchart for explaining a method of updating the usage status management table 500. The processing of the flowchart of FIG. 6 is triggered by, for example, addition of a new template, a scheduled batch processing, or the like. Each process (step) indicated by S number in the flowchart of FIG. 6 is realized by a CPU (not shown) of the program execution server 4 (an information processing apparatus) executing a predetermined program stored in the program execution server 4.

"Loop for the number of records" of S601 and S604 indicates that the processes of S602 and S603 between S601 and S604 are executed for each record as many as the number of records included in the usage status management table 500 ('20' in FIG. 5A).

In S602, the program execution server 4 judges whether or not the template usage date in the record is within a predetermined period of time. In the case that the program execution server 4 judges that the template usage date in the record is within the predetermined period of time (YES in S602), the program execution server 4 treats the inspection target record as the processing target of S605. On the other hand, in the case that the program execution server 4 judges that the template usage date in the record is not within the predetermined period of time (NO in S602), the program execution server 4 executes the process of S603.

In S603, the program execution server 4 deletes the inspection target record, for which it is judged that the template usage date in the record is not within the predetermined period of time, from the usage status management table 500. Thus, when the processes of S602 and S603 are completed for all the records of the usage status management table 500, in S605, the program execution server 4 updates the usage status management table 500 with the record for which the judgement in S602 is YES, and then ends the processing of the flowchart of FIG. 6.

Moreover, after updating the usage status management table 500, the program execution server 4 updates the usage count management table 510, the ranking management table 520, and the recommended template management table 530 based on the updated usage status management table 500.

In the first preferred embodiment, the predetermined period of time used to judge the template usage date is one month, and the usage status management table 500 is updated with the scheduled batch processing performed at the end of the month (midnight on the first day of the next month) as a trigger. In this case, if the scheduled batch processing is performed at midnight on May 1, 2022, the records before Apr. 1, 2022 will be deleted, while the records after Apr. 1, 2022 will remain, and as a result, as shown in FIG. 5A, the usage status management table 500 is updated. The usage status management table 500, the usage count management table 510, the ranking management table 520, and the recommended template management table 530, which are generated on a monthly basis, are stored in predetermined storing units (the template usage status storing unit 211, the ranking storing unit 212, and the recommendation storing unit 213), respectively. It should be noted that the predetermined period of time, during which the updating processing of the usage status management table 500 is performed, is not limited to one month, and is able to be set to any period of time, for example, may be half a year or one year.

Figure 7:
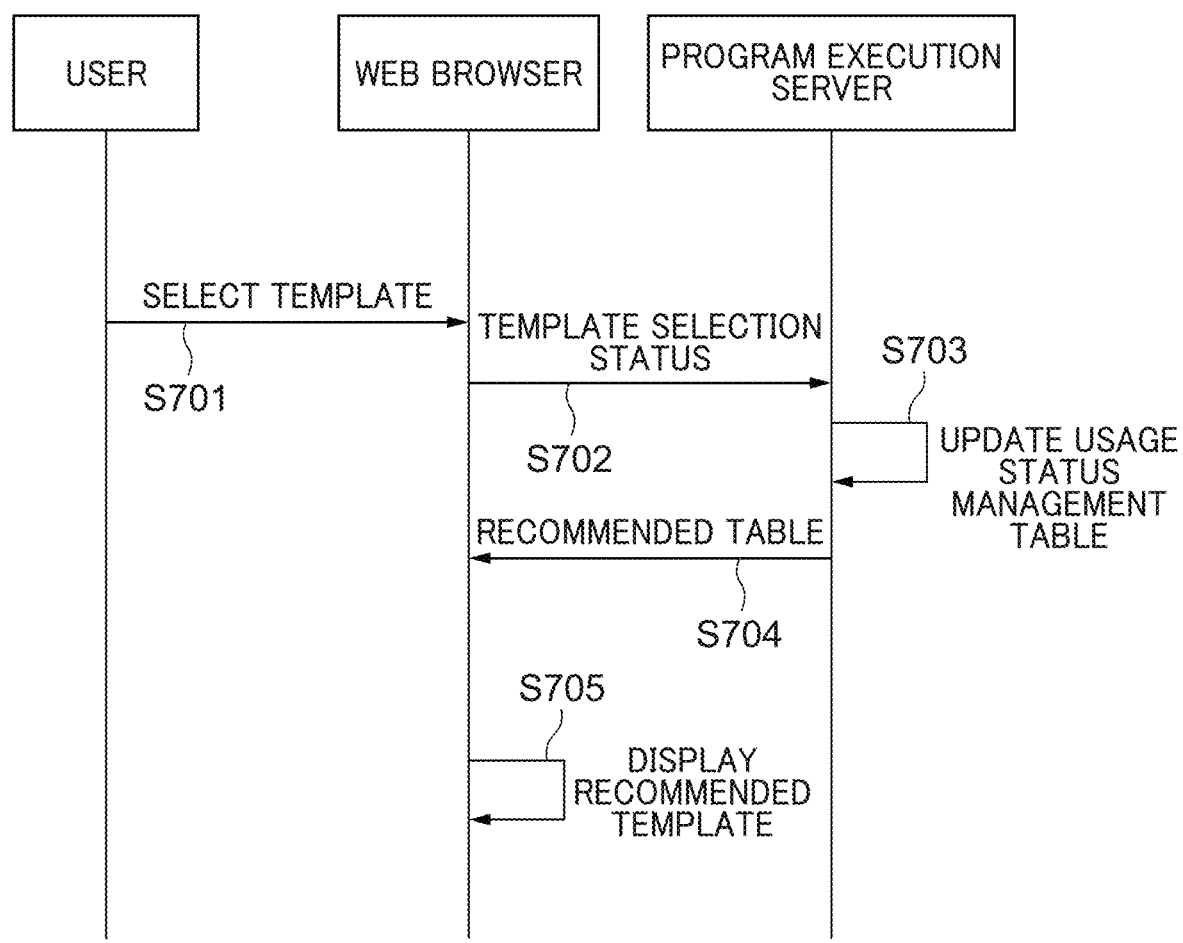
FIG. 7 is a sequence diagram for explaining the flow from template selection by a user to display of recommended templates on a poster editing screen.

FIG. 7 is a sequence diagram that shows the flow from template selection by the user to display of the recommended templates on the recommendation display area 405 of the poster editing screen. When a user selects a template on the web browser 20 in S701, the web browser 20 transmits the user ID of the user and the template ID of the selected template to the server system 2 (the program execution server 4) in S702. In S703, the program execution server 4 updates the storage contents of the template usage status storing unit 211 by adding a new record to the usage status management table 500 based on information received from the web browser 20 and storing it.

In S704, the program execution server 4 transmits a recommended table, which is information about the recommended templates displayed on the recommendation display area 405 (data stored in the recommended template management table 530 for the user), to the web browser 20. In S705, the web browser 20 displays the recommended templates on the recommendation display area 405 of the poster editing screen based on the template IDs of the recommended templates included in the received recommended table.

Next, a processing for determining the recommended templates, which is a feature of the first preferred embodiment, will be described. In the first preferred embodiment, a calculation method used to determine the recommended templates displayed on the recommendation display area 405 is switched in response to the template usage status of individual users and the template usage status of all users as a whole.

Figure 8:
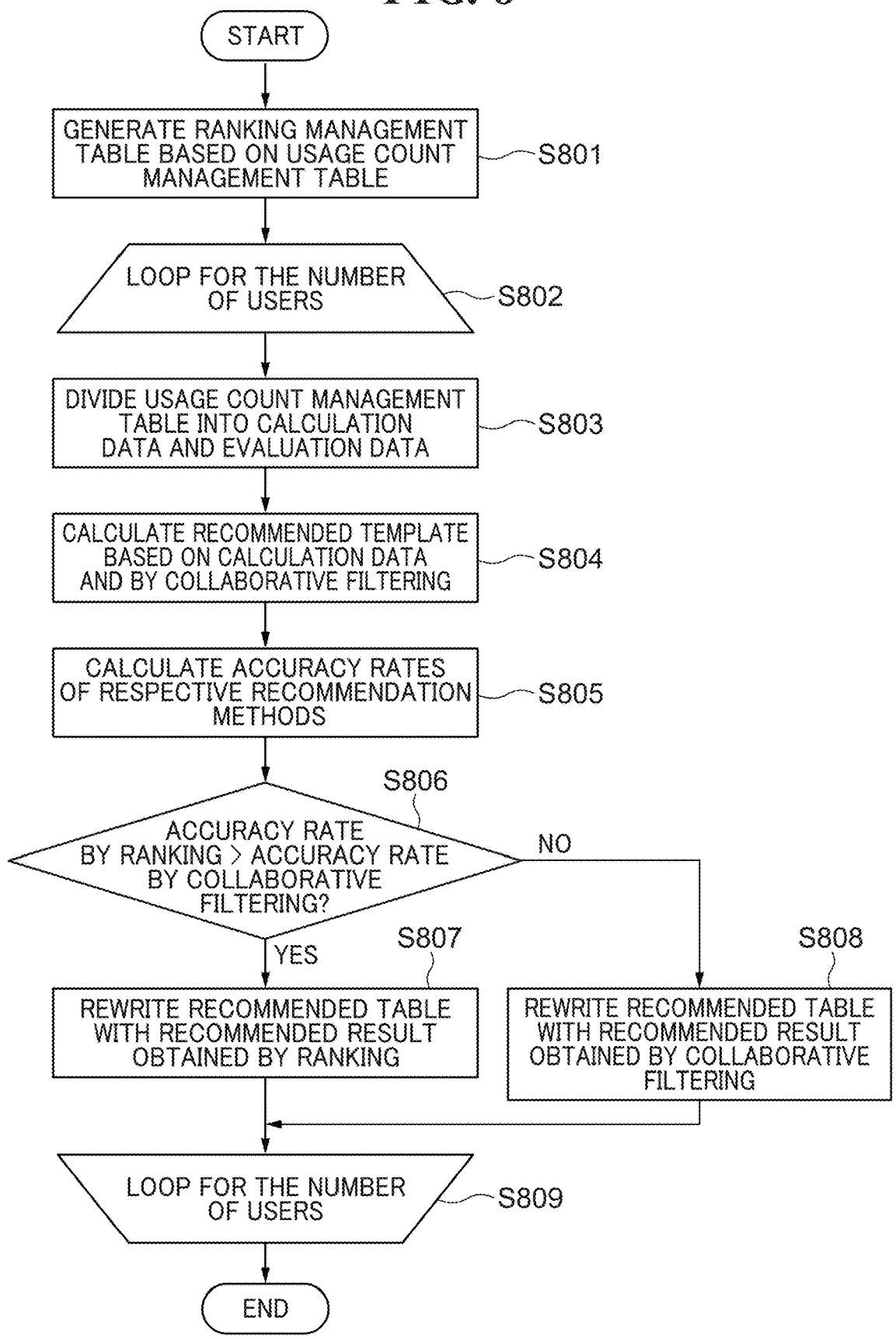
FIG. 8 is a flowchart that shows the flow of a recommended template determining processing in a first preferred embodiment.

FIG. 8 is a flowchart that shows the flow of the processing for determining the recommended templates (a recommended template determining processing) in the first preferred embodiment. The recommended template determining processing of the flowchart of FIG. 8 is triggered by, for example, addition of a new template, the scheduled batch processing, or the like. Each process (step) indicated by S number in the flowchart of FIG. 8 is realized by the CPU of the program execution server 4 executing a predetermined program stored in the program execution server 4.

In S801, the analyzing unit 203 generates a ranking management table by obtaining the total number of times each template has been used based on a usage count management table. FIG. 9A is a diagram that shows an example of a usage count management table 900, and FIG. 9B is a diagram that shows a ranking management table 910 generated based on the usage count management table 900. Moreover, here, the usage count management table 900 shows the same content as the usage count management table 510 of FIG. 5B, and the ranking management table 910 shows the same content as the ranking management table 520 of FIG. 5C.

The analyzing unit 203 stores and manages the number of times each template has been used by each user (the usage count of each template of each user) in the usage count management table 900 by using the user ID and the template ID. Further, the analyzing unit 203 obtains the sum of the number of times each template has been used by all users (the total usage count) for each template indicated by the template ID, and stores and manages them in the ranking management table 910.

"Loop for the number of users" of S802 and S809 indicates that the processes of S803 to S808 between S802 and S809 are executed for each user as many as the number of users.

In S803, the recommendation calculating unit 204 divides the records in the usage count management table 900 for a predetermined user into recommended calculation data (hereinafter, referred to as "calculation data") and recommended calculation result evaluation data (hereinafter, referred to as "evaluation data"). FIG. 9C is a diagram that shows an example of the calculation data, FIG. 9D is a diagram that shows an example of the evaluation data, and FIGS. 9C and 9D show results generated for a user B.

That is, it can be seen from the usage count management table 900 of FIG. 9A that the templates, which have been used by the user B, are three types of templates (i.e., the templates c, d, and e). Here, the recommendation calculating unit 204 selects, for example, the template d as the calculation data from the templates c, d, and e, and uses the remaining templates as the evaluation data.

It should be noted that "the remaining templates" referred to here are templates excluding the template selected as the calculation data from all templates, and therefore include templates with zero usage count. Further, in the first preferred embodiment, the division into the calculation data and the evaluation data is performed by using one piece of data from the data in the usage count management table 900 before division as the calculation data and using the remaining data as the evaluation data. However, the division ratio is not limited to this, and for example, the ratio of the calculation data to the evaluation data may be increased by setting the calculation data to two or more pieces of data.

In S804, the recommendation calculating unit 204 obtains the recommended templates to be provided to the user based on the calculation data by using the collaborative filtering. FIG. 9E is a diagram that shows an example of the recommended templates obtained by the collaborative filtering.

In S805, the comparing unit 205 compares the recommended templates with the evaluation data, and calculates the accuracy rate of the collaborative filtering and the accuracy rate of the ranking. The accuracy rate is a value that indicates the effectiveness of the recommendation method, and is obtained by a ratio (a rate) of the evaluation data included in a plurality of recommended templates obtained by the recommendation calculating unit 204.

For example, as shown in FIG. 9E, the recommended templates for the user B are the templates b, c, and e. On the other hand, it can be seen from the evaluation data of FIG. 9D that the user B uses the templates c and e, but does not use the template b. Therefore, the accuracy rate by the collaborative filtering is 67% (rounded down after the decimal point). On the other hand, since there are three recommended templates by the collaborative filtering, the accuracy rate by the ranking is an accuracy rate obtained in the case that the top three templates in the ranking are recommended. According to the ranking management table 910 of FIG. 9B, it can be seen that the templates a, b, and c are the top three templates that have been used the most. Here, since the templates used by the user B are the templates c, d, and e, the accuracy rate of the ranking is 33% (rounded down after the decimal point).

In S806, the comparing unit 205 judges whether or not the accuracy rate by the ranking is higher than the accuracy rate by the collaborative filtering. In the case that the comparing unit 205 judges that the accuracy rate by the ranking is higher than the accuracy rate by the collaborative filtering (YES in S806), the comparing unit 205 executes the process of S807. In S807, the comparing unit 205 rewrites the recommended table, which stores the recommended templates for the user being processed, with the recommended result obtained by the ranking. On the other hand, in the case that the comparing unit 205 judges that the accuracy rate by the ranking is equal to or lower than the accuracy rate by the collaborative filtering (NO in S806), the comparing unit 205 executes the process of S808. In S808, the comparing unit 205 rewrites the recommended table, which stores the recommended templates for the user being processed, with the recommended result obtained by the collaborative filtering. For example, in the case of the user B shown in FIGS. 9A, 9C, 9D, and 9E, as described above, since the accuracy rate by the collaborative filtering exceeds the accuracy rate by the ranking, the comparing unit 205 executes the process of S808.

It should be noted that in the case that the accuracy rate by the ranking and the accuracy rate by the collaborative filtering are the same, although the recommended table obtained by the collaborative filtering is rewritten with the recommended result obtained by the collaborative filtering here, it may be rewritten with the recommended result obtained by the ranking. When the recommended table for each user included in the recommended template management table is updated by performing the processes of S803 to S808 for each user, the recommended template determining processing of the flowchart of FIG. 8 ends.

As described above, in the first preferred embodiment, by switching between the recommendation based on the ranking and the recommendation based on the collaborative filtering in response to the template usage status of the user, it is possible to present the recommended templates to the user by using a more effective recommendation method. As a result, the user is able to easily find and use a desired template or a template that matches his or her taste, thereby the convenience is improved.

It should be noted that in the first preferred embodiment, although the recommendation based on the ranking and the recommendation based on the collaborative filtering are combined, other combinations of recommendation methods such as a combination of the content-based recommendation and the recommendation based on the collaborative filtering may be used. In this case as well, by selecting an appropriate recommendation method in response to the usage status of the user (the template usage status of the user), it is possible to obtain the same effect as in the case of using the combination of the recommendation based on the ranking and the recommendation based on the collaborative filtering.

Next, the second preferred embodiment will be described. In the second preferred embodiment, recommended content recommendation methods are combined, and a display rate of the recommended result obtained by each of the recommended content recommendation methods is changed based on the accuracy rate by each of the recommended content recommendation methods. It should be noted that in the second preferred embodiment, since the operations on the client terminal 10, the configuration of the web application screen, and the configuration of the poster editing screen conform to those in the first preferred embodiment, descriptions thereof will be omitted. In addition, for the recommendation method (the recommended content recommendation method), as in the first preferred embodiment, the recommendation method based on the collaborative filtering and the recommendation method based on the ranking are used.

Figure 10:
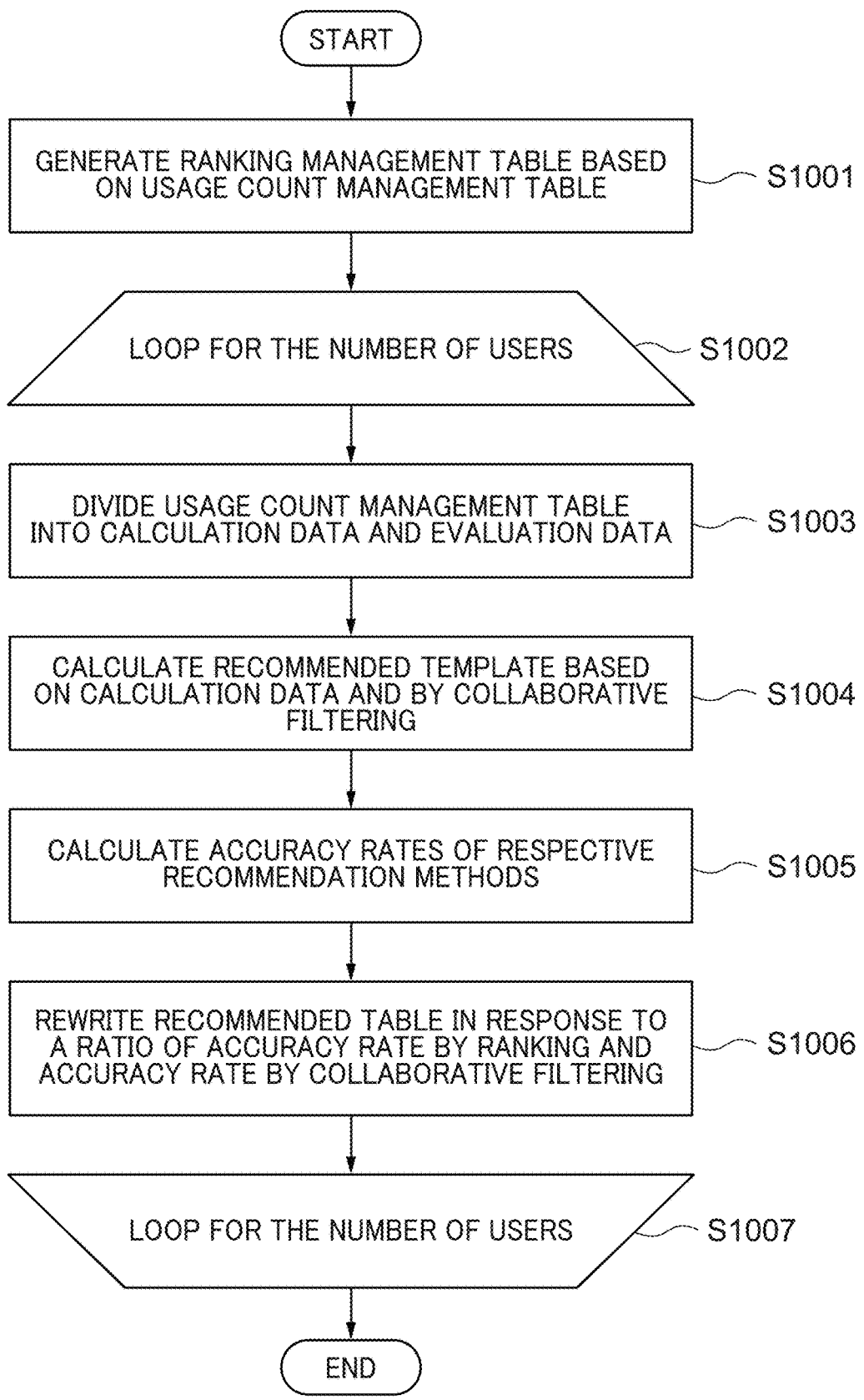
FIG. 10 is a flowchart that shows the flow of a recommended template determining processing in a second preferred embodiment.

FIG. 10 is a flowchart that shows the flow of a processing for determining the recommended templates (a recommended template determining processing) in the second preferred embodiment. The recommended template determining processing of the flowchart of FIG. 10 is triggered by, for example, addition of a new template, the scheduled batch processing, or the like. Each process (step) indicated by S number in the flowchart of FIG. 10 is realized by the CPU of the program execution server 4 executing a predetermined program stored in the program execution server 4.

The process of S1001 is the same as the process of S801 in the flowchart of FIG. 8. That is, in S1001, the analyzing unit 203 generates a ranking management table by obtaining the total number of times each template has been used based on a usage count management table. FIG. 11A is a diagram that shows an example of a usage count management table 1100, and FIG. 11B is a diagram that shows a ranking management table 1110 generated based on the usage count management table 1100.

"Loop for the number of users" of S1002 and S1007 indicates that the processes of S1003 to S1006 between S1002 and S1007 are executed for each user as many as the number of users. The processes of S1003 to S1005 are equivalent to the processes of S803 to S805 in the flowchart of FIG. 8.

That is, in S1003, the recommendation calculating unit 204 divides the records in the usage count management table 1100 for a predetermined user into calculation data and evaluation data. FIG. 11C is a diagram that shows an example of the calculation data, FIG. 11D is a diagram that shows an example of the evaluation data, and FIGS. 11C and 11D show results generated for the user B.

In the case of calculating the recommended templates for the user B, it can be seen from the usage count management table 1100 that the templates, which have been used by the user B, are two types of templates (i.e., the templates b and d). Among these, the template d is selected as the calculation data as shown in FIG. 11C, and the remaining data is used as the evaluation data as shown in FIG. 11D. It should be noted that in the second preferred embodiment, as in the first preferred embodiment, the division into the calculation data and the evaluation data is performed by using one piece of data from the data in the usage count management table 1100 before division as the calculation data and using the remaining data as the evaluation data. However, the division ratio is not limited to this.

In S1004, the recommendation calculating unit 204 obtains the recommended templates to be provided to the user based on the calculation data by using the collaborative filtering. FIG. 11E is a diagram that shows an example of the recommended templates obtained by the collaborative filtering.

In S1005, the comparing unit 205 compares the recommended templates with the evaluation data, and calculates the accuracy rate of the collaborative filtering and the accuracy rate by the ranking (the accuracy rate of the ranking).

For example, as shown in FIG. 11E, the recommended templates obtained by the collaborative filtering are the templates b and e. Here, from FIG. 11D showing the evaluation data, it can be seen that the user B uses the template b, but does not use the template e. Therefore, the accuracy rate of the collaborative filtering is 50%. On the other hand, since there are two recommended templates by the collaborative filtering, the accuracy rate by the ranking is an accuracy rate obtained in the case that the top two templates in the ranking are set as the recommended templates. In the case of the user B, from the ranking management table 1110, it can be seen that the templates a and b are the top two templates that have been used the most. Therefore, as shown in FIG. 11F, the recommended templates for the user B, which are obtained by the ranking, are the templates a and b. Since the templates used by the user B are the templates b and d, the accuracy rate by the ranking is 50%.

In S1006, the comparing unit 205 compares and combines the accuracy rate of the recommendation based on the ranking and the accuracy rate of the recommendation based on the collaborative filtering, and rewrites the recommended table based on the results of the comparison and combination. In the case of the user B, as described above, both the accuracy rate by the collaborative filtering and the accuracy rate by the ranking are 50%. Therefore, the comparing unit 205 rewrites the recommended table so that 50% of the recommended templates for the user B are the recommended result obtained by the collaborative filtering, and the remaining 50% are the recommended result obtained by the ranking. For example, it is assumed that the web application executed by the program execution server 4 always presents ten templates as the recommended templates. In this case, five templates among the ten templates are selected as the recommended templates by the collaborative filtering, and the remaining five templates are adopted as the recommended templates by the ranking.

When the recommended table for each user included in the recommended template management table is updated by performing the processes of S1003 to S1006 for each user, the recommended template determining processing of the flowchart of FIG. 10 ends.

Figure 12:
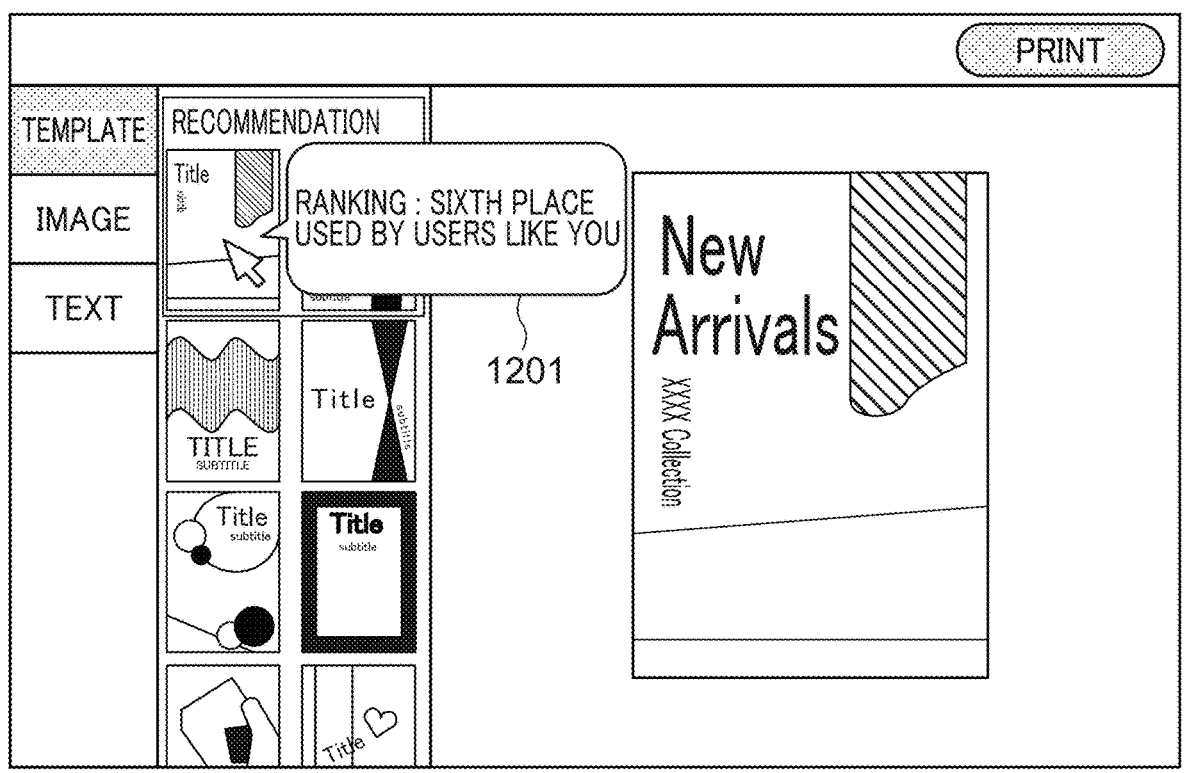
FIG. 12 is a diagram that shows another example of the poster editing screen displayed on a monitor.

FIG. 12 is a diagram that shows another example of the poster editing screen displayed on the monitor 14. As shown in FIG. 12, when a mouse, which is an example of the input device 16, is operated and a mouseover operation executed by the mouse is performed with respect to one of the recommended templates, a reason for recommending the recommended template, to which, the mouseover operation is performed, may be displayed on a pop-up display 1201. Such display control is prepared in the web application executed by the program execution server 4, and is realized by the CPU of the program execution server 4 executing a predetermined program.

As described above, in the second preferred embodiment, the recommended templates are determined by combining a plurality of recommendation methods in response to the template usage status of the user. As a result, the user is able to easily find and use a desired template or a template that matches his or her taste, thereby the convenience is improved.

It should be noted that in the second preferred embodiment, although the recommendation based on the ranking and the recommendation based on the collaborative filtering are combined, other combinations of recommendation methods such as a combination of the content-based recommendation and the recommendation based on the collaborative filtering may be used. In addition, the number of the recommendation methods to be combined is not limited to two, and three or more recommendation methods may be combined, in which case a combination rate of each recommendation method is able to be set arbitrarily. Even in this way, it is possible to obtain the same effect as in the case of using the combination of the recommendation based on the ranking and the recommendation based on the collaborative filtering described above.

Next, the third preferred embodiment will be described. In the third preferred embodiment, when combining the plurality of recommendation methods in the second preferred embodiment, a threshold value is used to combine only effective recommendation methods. Specifically, a threshold value, which makes the recommendation method to be regarded as effective, is set, and only the recommendation methods, by any one of which an accuracy rate equal to or greater than the set threshold value is obtained, are combined. Here, it is assumed that in the web application executed by the program execution server 4, the threshold value is set to 40%. However, the threshold value is not limited to 40%, and is able to be changed by the program execution server 4 as appropriate.

Figure 13:
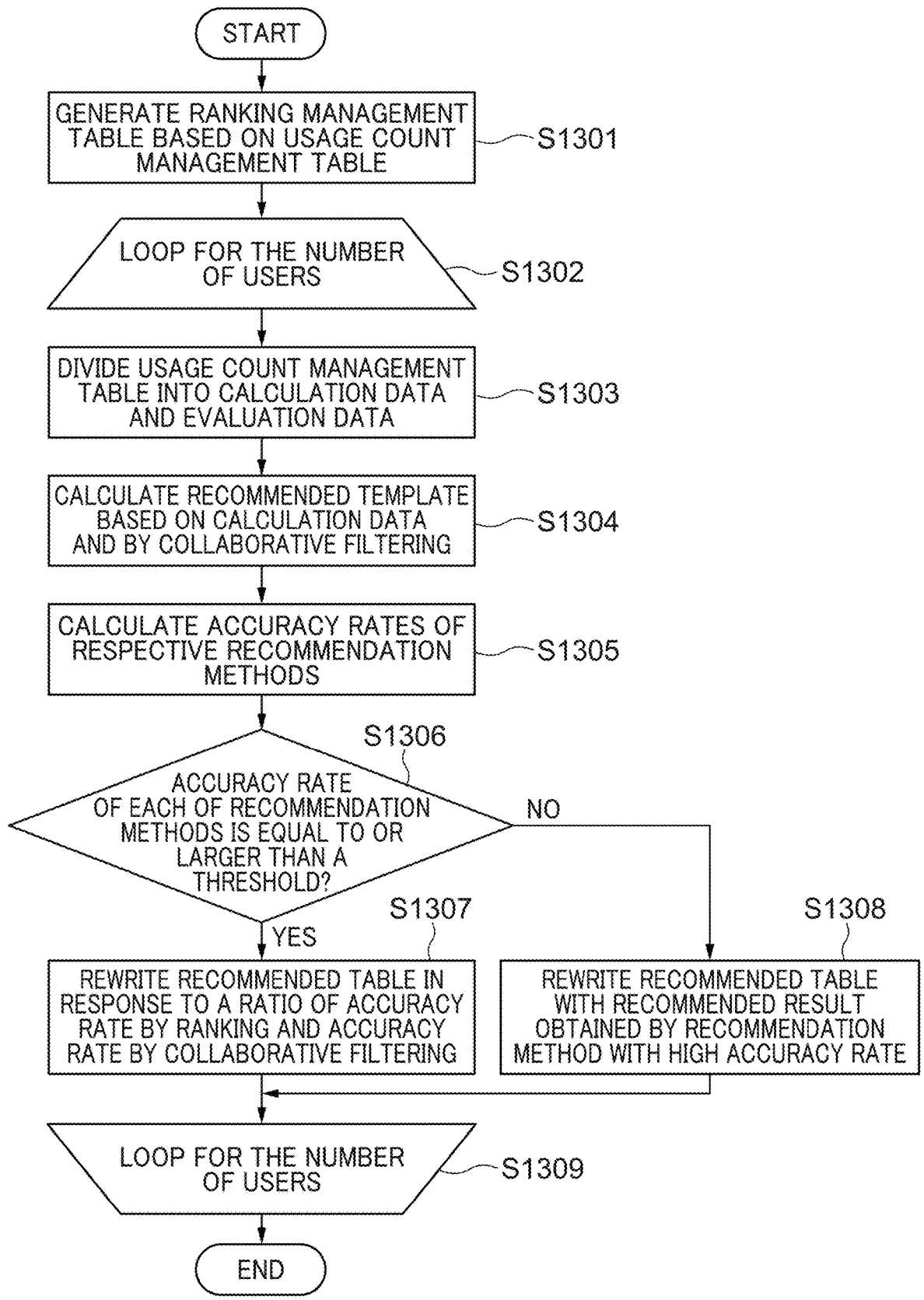
FIG. 13 is a flowchart that shows the flow of a recommended template determining processing in a third preferred embodiment.

FIG. 13 is a flowchart that shows the flow of a processing for determining the recommended templates (a recommended template determining processing) in the third preferred embodiment. The recommended template determining processing of the flowchart of FIG. 13 is triggered by, for example, addition of a new template, the scheduled batch processing, or the like. Each process (step) indicated by S number in the flowchart of FIG. 13 is realized by the CPU of the program execution server 4 executing a predetermined program stored in the program execution server 4 and comprehensively controlling the operations of respective units of the program execution server 4.

For comparison with the second preferred embodiment, the processes of S1301 and S1303 to S1305 are the same as the processes of S1001 and S1003 to S1005 in the flowchart of FIG. 10, and therefore, the detailed descriptions of the processes of S1301 and S1303 to S1305 are omitted. Moreover, "loop for the number of users" of S1302 and S1309 indicates that the processes of S1303 to S1308 between S1302 and S1309 are executed for each user as many as the number of users.

In S1306, the comparing unit 205 judges whether or not both the accuracy rate by the ranking and the accuracy rate by the collaborative filtering are equal to or greater than the threshold value. In the case that the comparing unit 205 judges that both the accuracy rate by the ranking and the accuracy rate by the collaborative filtering are equal to or greater than the threshold value (YES in S1306), the comparing unit 205 executes the process of S1307. The process of S1307 is the same as the process of S1006. In S1307, the comparing unit 205 compares and combines the accuracy rate of the recommendation based on the ranking and the accuracy rate of the recommendation based on the collaborative filtering, and rewrites the recommended table based on the results of the comparison and combination.

On the other hand, in the case that the comparing unit 205 judges that at least one of the accuracy rate by the ranking and the accuracy rate by the collaborative filtering is less than the threshold value (NO in S1306), the comparing unit 205 executes the process of S1308. In S1308, the comparing unit 205 rewrites the recommended table with the recommended result obtained by the recommendation method with a high accuracy rate.

As an example, similar to the description in the second preferred embodiment, based on the usage count management table 1100 shown in FIG. 11A, the recommended templates for the user B are determined as follows.

That is, both the accuracy rate by the collaborative filtering and the accuracy rate by the ranking are 50%. In the case that the threshold value of the accuracy rate, which makes the recommendation method to be regarded as effective, is 40%, it is judged that both the recommendation based on the collaborative filtering and the recommendation based on the ranking are effective recommendation methods. For example, it is assumed that the web application executed by the program execution server 4 presents ten templates as the recommended templates. In this case, five templates among the ten templates are selected as the recommended templates by the collaborative filtering, and the remaining five templates are adopted as the recommended templates by the ranking.

On the other hand, in the case that the accuracy rate by the ranking is equal to or greater than the threshold value and the accuracy rate by the collaborative filtering is less than the threshold value, all ten recommended templates for the user B are the templates obtained by the ranking. Moreover, in one case that the judgement in S1306 is 'NO', a case, in which depending on the set threshold value, both the accuracy rate by the collaborative filtering and the accuracy rate by the ranking are less than the threshold value, is assumed. In this case, the process of S1308 is executed, and the recommended table is rewritten with the recommended result obtained by the recommendation method with the higher accuracy rate among the accuracy rate by the collaborative filtering less than the threshold value and the accuracy rate by the ranking less than the threshold value.

When the recommended table for each user included in the recommended template management table is updated by performing the processes of S1303 to S1308 for each user, the recommended template determining processing of the flowchart of FIG. 13 ends.

As described above, in the third preferred embodiment, the recommended templates are determined by combining the plurality of recommendation methods, but the recommendation method with a low accuracy rate is not used. As a result, the user is able to easily find and use a desired template or a template that matches his or her taste, thereby the convenience is improved. Furthermore, such an effect is able to be obtained more remarkably in the third preferred embodiment than in the second preferred embodiment.

It should be noted that the modifications described in the description of the second preferred embodiment are also able to be applied to the third preferred embodiment. In addition, for example, in the case that three recommendation methods are combined, when the accuracy rates of two recommendation methods are equal to or greater than the threshold value and the accuracy rate of one recommendation method is less than the threshold value, only the two recommendation methods whose accuracy rates are equal to or greater than the threshold value are combined. Also, in the case of combining four or more recommendation methods, a similar technique is used.

Next, the fourth preferred embodiment will be described. In the fourth preferred embodiment, when combining the plurality of recommendation methods as in the second preferred embodiment, the number of the recommended templates to be presented to the user, which are displayed on the monitor 14, for each recommendation method is changed in response to the accuracy rate.

Figure 14:
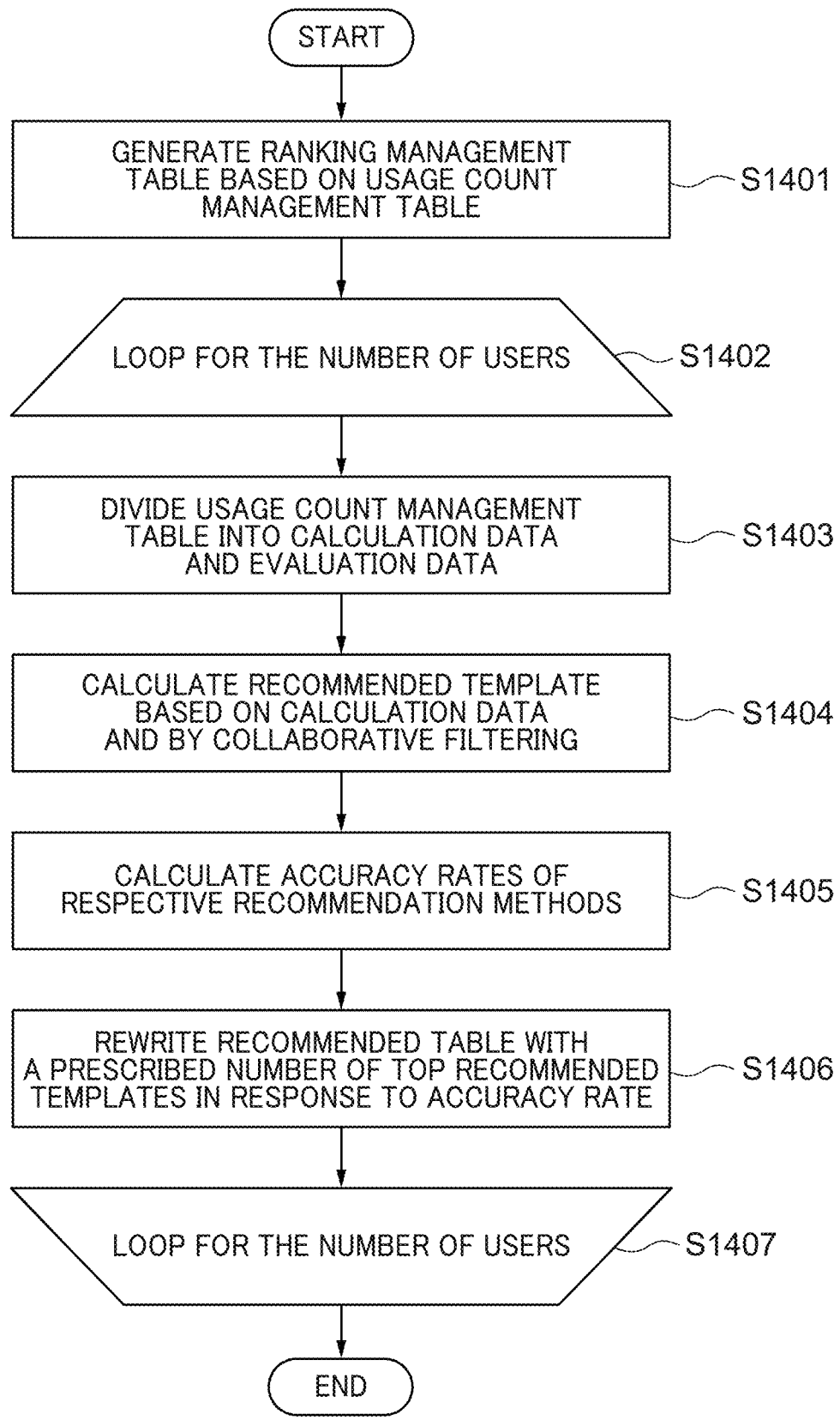
FIG. 14 is a flowchart that shows the flow of a recommended template determining processing in a fourth preferred embodiment.

FIG. 14 is a flowchart that shows the flow of a processing for determining the recommended templates (a recommended template determining processing) in the fourth preferred embodiment. The recommended template determining processing of the flowchart of FIG. 14 is triggered by, for example, addition of a new template, the scheduled batch processing, or the like. Each process (step) indicated by S number in the flowchart of FIG. 14 is realized by the CPU of the program execution server 4 executing a predetermined program stored in the program execution server 4.

For comparison with the second preferred embodiment, the processes of S1401 and S1403 to S1405 are the same as the processes of S1001 and S1003 to S1005 in the flowchart of FIG. 10, and therefore, the detailed descriptions of the processes of S1401 and S1403 to S1405 are omitted. Moreover, "loop for the number of users" of S1402 and S1407 indicates that the processes of S1403 to S1406 between S1402 and S1407 are executed for each user as many as the number of users.

In S1406, the comparing unit 205 rewrites the recommended table with a prescribed number of top recommended templates in response to the accuracy rate of each recommendation method. For example, it is assumed that ten templates are recommended when the accuracy rate is 100%. This condition is applied to the example of FIGS. 9A, 9B, 9C, 9D, and 9E. By doing so, since the accuracy rate by the collaborative filtering is 67% and the accuracy rate by the ranking is 33%, the recommended table is rewritten with the top seven recommended templates obtained by the collaborative filtering and the top three recommended templates obtained by the ranking at a ratio proportional to the accuracy rate by the collaborative filtering and the accuracy rate by the ranking.

When the recommended table for each user included in the recommended template management table is updated by performing the processes of S1403 to S1406 for each user, the recommended template determining processing of the flowchart of FIG. 14 ends.

In the fourth preferred embodiment, among the plurality of recommendation methods, more templates obtained by the recommendation method with a higher accuracy rate are displayed than templates obtained by the recommendation method with a lower accuracy rate. As a result, the user is able to easily find and use a desired template or a template that matches his or her taste, thereby the convenience is improved. Furthermore, such an effect is able to be obtained more remarkably in the fourth preferred embodiment than in the second preferred embodiment. It should be noted that the modifications described in the description of the second preferred embodiment are also able to be applied to the fourth preferred embodiment.

Although the present invention has been described in detail based on its preferred embodiments, the present invention is not limited to these specific embodiments, and includes various embodiments without departing from the gist of the present invention. Furthermore, each preferred embodiment described above merely shows one embodiment of the present invention, and it is also possible to combine each preferred embodiment as appropriate.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-110516, filed on Jul. 8, 2022, which is hereby incorporated by reference herein in its entirety.

What is claimed is:

1. An information processing apparatus comprising:
a controller configured or programmed to function as:
a storing unit that stores a usage count of each of a plurality of contents used by each of a plurality of users;
a dividing unit that divides data about the usage count into calculation data for obtaining contents to be recommended to a predetermined user among the plurality of users and evaluation data for obtaining an accuracy rate of a recommended result;
a first calculating unit that obtains a first recommended result, which is the contents to be recommended to the predetermined user, by a first recommendation method;
a second calculating unit that calculates a second recommended result, which is the contents to be recommended to the predetermined user, based on the calculation data by a second recommendation method;
a third calculating unit that obtains a first accuracy rate, which is an accuracy rate of the first recommended result, and a second accuracy rate, which is an accuracy rate of the second recommended result, based on the evaluation data; and
a setting unit that sets a recommendation method for determining the contents to be recommended to the predetermined user by using the first recommendation method and the second recommendation method based on the first accuracy rate and the second accuracy rate.

2. The information processing apparatus according to claim 1,
wherein the setting unit sets the recommendation method, by which a higher accuracy rate among the first accuracy rate and the second accuracy rate is obtained, to the recommendation method for determining the contents to be recommended to the predetermined user.

3. The information processing apparatus according to claim 1,
wherein the setting unit sets, a combination of the first recommendation method and the second recommendation method according to the first accuracy rate and the second accuracy rate, to the recommendation method for determining the contents to be recommended to the predetermined user.

4. The information processing apparatus according to claim 3,
wherein the controller is configured or programmed to function as a determining unit that determines the contents to be recommended to the predetermined user by combining the first recommended result and the second recommended result at a ratio proportional to the first accuracy rate and the second accuracy rate.

5. The information processing apparatus according to claim 3,
wherein the controller is configured or programmed to function as a determining unit that determines the number of the contents to be recommended to the predetermined user, which are displayed on a predetermined display device, at a ratio proportional to the first accuracy rate and the second accuracy rate.

6. The information processing apparatus according to claim 4,
wherein the controller is configured or programmed to function as a display control unit that, when the contents to be recommended to the predetermined user are displayed on a predetermined display device, displays a reason for recommending the displayed contents by the setting unit on the predetermined display device.

7. The information processing apparatus according to claim 5,
wherein the controller is configured or programmed to function as a display control unit that, when the contents to be recommended to the predetermined user are displayed on the predetermined display device, displays a reason for recommending the displayed contents by the setting unit on the predetermined display device.

8. The information processing apparatus according to claim 1,
wherein the controller is configured or programmed to function as a threshold value setting unit that sets a threshold value with respect to the first accuracy rate and the second accuracy rate,
in a case that both the first accuracy rate and the second accuracy rate are equal to or greater than the threshold value, the setting unit sets, a combination of the first recommendation method and the second recommendation method according to the first accuracy rate and the second accuracy rate, to the recommendation method for determining the contents to be recommended to the predetermined user, and
in a case that both the first accuracy rate and the second accuracy rate are not equal to or greater than the threshold value, the setting unit sets the recommendation method, by which a higher accuracy rate among the first accuracy rate and the second accuracy rate is obtained, to the recommendation method for determining the contents to be recommended to the predetermined user.

9. The information processing apparatus according to claim 1,
wherein the first recommendation method and the second recommendation method are two recommendation methods selected from a recommendation method based on ranking, a recommendation method based on content-based recommendation, and a recommendation method based on collaborative filtering.

10. A control method for an information processing apparatus,
the control method comprising:
storing a usage count of each of a plurality of contents used by each of a plurality of users;
dividing data about the usage count into calculation data for obtaining contents to be recommended to a predetermined user among the plurality of users and evaluation data for obtaining an accuracy rate of a recommended result;
obtaining a first recommended result, which is the contents to be recommended to the predetermined user, by a first recommendation method;
calculating a second recommended result, which is the contents to be recommended to the predetermined user, based on the calculation data by a second recommendation method;
obtaining a first accuracy rate, which is an accuracy rate of the first recommended result, and a second accuracy rate, which is an accuracy rate of the second recommended result, based on the evaluation data; and
performing setting of a recommendation method for determining the contents to be recommended to the predetermined user by using the first recommendation method and the second recommendation method based on the first accuracy rate and the second accuracy rate.

11. A non-transitory computer-readable storage medium storing a program for causing a computer to execute a control method for an information processing apparatus,
the control method comprising:
storing a usage count of each of a plurality of contents used by each of a plurality of users;
dividing data about the usage count into calculation data for obtaining contents to be recommended to a predetermined user among the plurality of users and evaluation data for obtaining an accuracy rate of a recommended result;
obtaining a first recommended result, which is the contents to be recommended to the predetermined user, by a first recommendation method;
calculating a second recommended result, which is the contents to be recommended to the predetermined user, based on the calculation data by a second recommendation method;
obtaining a first accuracy rate, which is an accuracy rate of the first recommended result, and a second accuracy rate, which is an accuracy rate of the second recommended result, based on the evaluation data; and
performing setting of a recommendation method for determining the contents to be recommended to the predetermined user by using the first recommendation method and the second recommendation method based on the first accuracy rate and the second accuracy rate.

* * * * *